US009317601B2

(12) United States Patent
Dozier et al.

(10) Patent No.: US 9,317,601 B2
(45) Date of Patent: Apr. 19, 2016

(54) SYSTEMS, METHODS, AND SOFTWARE FOR ASSESSING AMBIGUITY OF MEDICAL TERMS

(75) Inventors: Christopher C. Dozier, Minneapolis, MN (US); Mark Chaudhary, Eagan, MN (US); Ravi Kondadadi, Eagan, MN (US)

(73) Assignee: Thomson Reuters Global Resources (CH)

( * ) Notice: Subject to any disclaimer, the term of this patent is extended or adjusted under 35 U.S.C. 154(b) by 2961 days.

(21) Appl. No.: 11/538,583

(22) Filed: Oct. 4, 2006

(65) Prior Publication Data
US 2007/0156674 A1 Jul. 5, 2007

Related U.S. Application Data

(60) Provisional application No. 60/723,483, filed on Oct. 4, 2005.

(51) Int. Cl.
G06F 17/30 (2006.01)
G06F 17/27 (2006.01)

(52) U.S. Cl.
CPC ...... *G06F 17/30864* (2013.01); *G06F 17/2785* (2013.01); *G06F 17/30014* (2013.01); *G06F 17/30672* (2013.01); *G06F 17/30867* (2013.01); *G06F 17/30286* (2013.01)

(58) Field of Classification Search
CPC ............... G06F 17/30598; G06F 17/30864; G06F 17/277; G06F 17/30604; G06F 17/2705; G06F 17/28; G06F 17/30268; G06F 17/30477; G06F 17/30525; G06F 17/3061

USPC ........ 707/759, 765, 766, 767, 768, 769, 771, 707/780, 750, 803
See application file for complete search history.

(56) References Cited

U.S. PATENT DOCUMENTS 5,991,755 A * 11/1999 Noguchi et al.
6,654,742 B1 * 11/2003 Kobayashi ........................ 707/7
7,003,719 B1 * 2/2006 Rosenoff et al. ............... 715/205
7,124,031 B1 * 10/2006 Hoffman et al. ................ 702/19
7,333,966 B2 * 2/2008 Dozier ............................ 706/21
7,630,947 B2 * 12/2009 Pandya et al. ................... 706/45

(Continued)

FOREIGN PATENT DOCUMENTS

WO WO-2005/020091 A1 3/2005
WO WO-2007044350 A2 4/2007
WO WO-2007044350 A3 4/2007

OTHER PUBLICATIONS

"International Search Report for corresponding PCT Application No. PCT/US2006/038671", (Mar. 30, 2007), 4 pgs.

(Continued)

*Primary Examiner* — Pierre Vital
*Assistant Examiner* — Andalib Lodhi
(74) *Attorney, Agent, or Firm* — Duncan Galloway; Egan Greenwald, PLLC; Kevin T. Duncan

(57) ABSTRACT

Some known medical terms may function as non-medical terms depending on their particular context. Accordingly, the present inventors devised systems, methods, and software that facilitate determining whether a term that is found in a medical corpus is likely to be a medical term when found in another corpus. An exemplary embodiment receives a term and computes an ambiguity score based on language models for a medical and a non-medical corpus.

18 Claims, 2 Drawing Sheets

(56) References Cited

U.S. PATENT DOCUMENTS

| | | | |
|---|---|---|---|
| 2002/0049593 A1* | 4/2002 | Shao | 704/251 |
| 2003/0105638 A1* | 6/2003 | Taira | 704/275 |
| 2003/0135826 A1 | 7/2003 | Dozier | |
| 2003/0154208 A1* | 8/2003 | Maimon et al. | 707/100 |
| 2004/0210443 A1* | 10/2004 | Kuhn et al. | 704/276 |
| 2005/0102259 A1* | 5/2005 | Kapur | 707/1 |
| 2006/0052945 A1* | 3/2006 | Rabinowitz et al. | 702/20 |
| 2007/0174267 A1* | 7/2007 | Patterson et al. | 707/5 |

OTHER PUBLICATIONS

Dozier, C., et al., "Automatic Extraction and Linking of Person Names in Legal Text", *Proceedings of RIAO-2000: Recherche d'Informations Assistée par Ordinateur*, Paris, France, (2000), 1305-1321.

"European Application Serial No. 06825408.5, Office action mailed Mar. 18, 2009", 4 pgs.

* cited by examiner

SYSTEMS, METHODS, AND SOFTWARE FOR ASSESSING AMBIGUITY OF MEDICAL TERMS

CROSS-REFERENCE TO RELATED APPLICATION

This application claims priority to U.S. provisional application 60/723,483 filed on Oct. 4, 2005. The provisional application is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2005-2006, Thomson Global Resources.

TECHNICAL FIELD

Various embodiments of the present invention concern systems, methods, and software for identifying medical content in documents and linking those documents to other documents based on the medical content.

BACKGROUND

The fantastic growth of the Internet and other computer networks has fueled an equally fantastic growth in the data accessible via these networks. One of the seminal modes for interacting with this data is through the use of hyperlinks within electronic documents.

Hyperlinks are user-selectable elements, such as highlighted text or icons, that link one portion of an electronic document to another portion of the same document or to other documents in a database or computer network. With proper computer equipment and network access, a user can select or invoke a hyperlink and almost instantaneously view the other document, which can be located on virtually any computer system in the world.

Although many hyperlinks are created and inserted into documents manually, recent years have seen development of automated techniques for identifying specific types of document text and linking the identified text using hyperlinks to other related documents. For example, to facilitate legal research, the Westlaw legal research system automatically identifies legal citations and attorney names in text and links the citations to corresponding legal documents in a database and the attorney names to biographical entries in an online directory. For further details, see U.S. Pat. No. 7,003,719 and U.S. Published Patent Application US2003/0135826A1, both of which are incorporated herein by reference.

Although the automated linking technology in the Westlaw system is highly effective for legal citations and names, the present inventors have identified that this technology is not well suited for other types of content, such as medical terms. For example, the inventors recognize that identifying legal citations and entity names within a text is generally simpler than identifying medical terms because terms may function as medical terms in one context and as non-medical terms in another. Legal citations and person names, on the other hand, generally function as legal citations and person names regardless of context.

Accordingly, the present inventors have identified a need for automated methods identifying whether terms are medical terms or non-medical terms.

SUMMARY

To address this and/or other needs, the inventors devised, among other things, systems, methods, and software that facilitate determining whether a term is a medical term or a non-medical term.

DETAILED DESCRIPTION OF EXEMPLARY EMBODIMENTS

Figure 1:
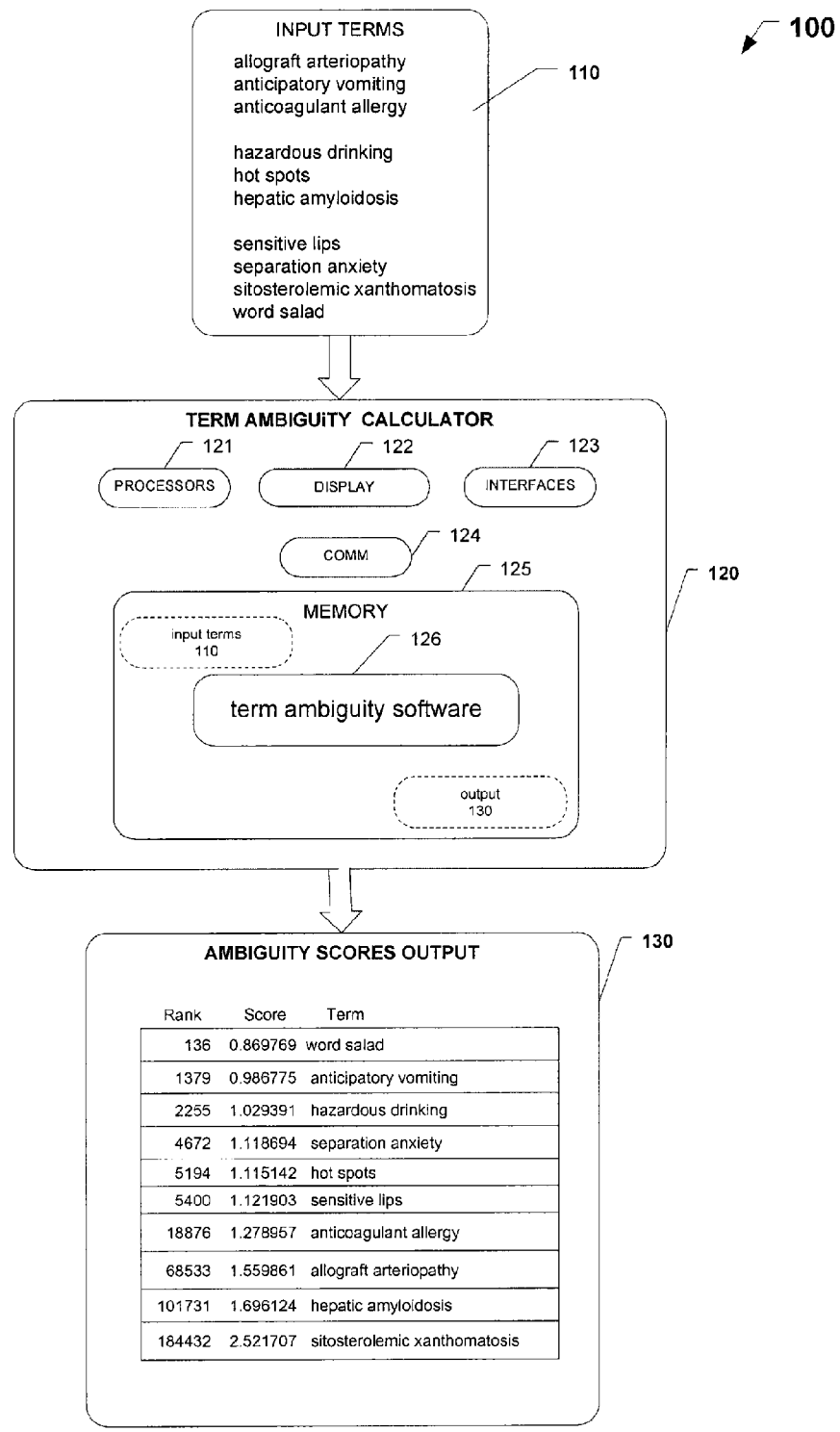
FIG. 1 is a block diagram of an exemplary system 100 which corresponds to one or more embodiment of the present invention.
Figure 2:
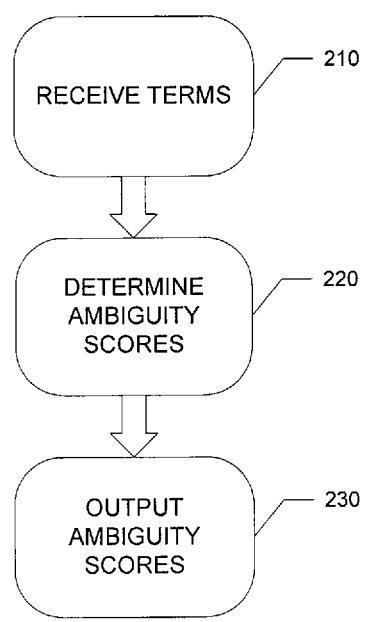
FIG. 2 is a flow chart of an exemplary method of operating system 100 which corresponds to one or more embodiments of the invention.

The following detailed description, which references and incorporates FIGS. 1 and 2, describes and illustrates one or more exemplary embodiments of the invention. These embodiments, offered not to limit but only to exemplify and teach the invention, are shown and described in sufficient detail to enable those skilled in the art to make and use the invention. Thus, where appropriate to avoid obscuring the invention, the description may omit certain information known to those of skill in the art.

Exemplary Computer System Embodying the Invention

FIG. 1 shows a diagram of an exemplary computer system 100 incorporating a system, method, and software for assessing the ambiguity of terms, such as medical terms. Though the exemplary system is presented as an interconnected ensemble of separate components, some other embodiments implement their functionality using a greater or lesser number of components. Moreover, some embodiments intercouple one or more the components through wired or wireless local- or wide-area networks. Some embodiments implement one or more portions of system 100 using one or more mainframe computers or servers.) Thus, the present invention is not limited to any particular functional partition.

Generally, system 100 includes input terms 110, term-ambiguity calculator 120, and ambiguity scores output 130.

Input terms 110 includes one or more terms, such as a set of terms from a medical database. In the exemplary embodiment, input terms 110 includes terms from the Unified Medical Language System (UMLS). The table below shows that UMLS includes a great number of terms in disease, injury, medical procedure, body part, and drug categories.

| Category | Terms | Concepts |
| --- | --- | --- |
| Disease | 189,712 | 69,948 |
| Injury | 42,141 | 28,997 |
| Medical procedure | 134,179 | 72,918 |
| Body part | 38,041 | 22,260 |
| Drugs | 244,752 | 129,959 |

In some embodiment, input terms 110 are terms extracted from one or more input documents, such as an electronic judicial opinion. or other type legal document.

Coupled to database 110 is term-ambiguity calculator 120. Calculator 120 includes one or more conventional processors 121, display device 122, interface devices 123, network-communications devices 124, and memory 125. Memory 125, which can take a variety of forms, such as coded instructions or data on an electrical, magnetic, and/or optical carrier medium, includes term-ambiguity software 126. Term-ambiguity software 126 includes various software and data components, for determining or calculating for each input term t and ambiguity score, Score(term) defined as $$\text{Score (term)} = \lambda_1 \frac{\log(P(t \mid \text{News\_lang}))}{\log(P(t \mid \text{UMLS\_lang}))} + \lambda_2 \frac{\log(P(t \mid \text{Legal\_lang}))}{\log(P(t \mid \text{UMLS\_lang}))}$$

where $$\log(P(t \mid lang)) = \sum_{i=1}^{n} \log(P(ngram \mid lang))$$

and lambda1 and lambda2 are constants, which in some embodiments are used to normalize or smooth the scoring function. In some embodiments, lambda1 and lambda2 are set to 0.5. The exemplary embodiment uses ngram backoff with Witten Bell smoothing to smooth the language models.

The exemplary scoring function is based on the intuition that medical ngrams, such as "hepatic," occur relatively more often in UMLS than in news or legal and that ngrams such as "drinki" will occur relatively more often in news or legal than in UMLS. Terms having ngrams that are more highly predicted by UMLS than news or legal tend to yield a larger score and thus indicate that the given term is more likely a medical term than not a medical term when found in a news or legal document.

Term-ambiguity calculator 120 outputs a set 130 of one or more ambiguity scores based on the input terms. (FIG. 1 shows that the input terms 110 and output scores 130 are also retained in memory 130.) In the exemplary embodiment, the scores are output as a ranked list, with each score associated with corresponding terms. (Note that term may include one or more words.)

The ambiguity scores can be used for a variety of purposes, including for example determining whether it is appropriate to insert a link in a document including a given term back to a ULMS document associated with the term. For example, in the output terms shown the terms having an ambiguity score greater than 1.5 may be considered as clearly being medical terms and thus linked with high confidence back to related ULMS documents. On the other hand, terms such as "word salad" or "anticipatory vomiting" that have lower scores should not generally be linked back to a related ULMS document without contextual corroboration.

Exemplary Operation of System 100

FIG. 2 shows a flowchart 200 illustrating an exemplary method of operating system 100. Flow chart 200 includes process blocks 210-230. Though these blocks (and those of other flow charts in this document) are arranged serially in the exemplary embodiment, other embodiments may reorder the blocks, omit one or more blocks, and/or execute two or more blocks in parallel using multiple processors or a single processor organized as two or more virtual machines or subprocessors. Moreover, still other embodiments implement the blocks as one or more specific interconnected hardware or integrated-circuit modules with related control and data signals communicated between and through the modules. Thus, this and other exemplary process flows in this document are applicable to software, firmware, hardware, and other types of implementations.

Block 210 entails receiving a set of terms. In the exemplary embodiment, this entails receiving a set of terms from ULMS or an input news or legal document into memory 126 of term-ambiguity calculator 120. Execution continues at block 220.

Block 220 entails determining one or more ambiguity scores for one or more of the input terms. In the exemplary embodiment this entails computing ambiguity scores according to the definition set forth above for Score(term) in equation above, which provides a sum of two conditional probability ratios. Each conditional probability is based on language model of set or corpus of documents. In some embodiments, one of the conditional probability ratios is omitted from the scoring function. Also, in some embodiments, the conditional probability ratios are inverted.

Block 230 entails outputting one or more of the determined ambiguity scores. In the exemplary embodiment, this entails outputting in printed or other human readable form; however, in other embodiments, the output may also be used by another machine, component, or software module, or simply retained in memory.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A computer-implemented method comprising:
receiving a term;
determining by the computer an ambiguity score for the term, wherein the ambiguity score is on ratio of a probability of the term and at least first, second and third language models of a plurality of language models, and wherein the first language model is based on a medical corpus of documents and the second language model is based on a general news corpus of documents and the third language model is based on a legal corpus of documents,
wherein the ambiguity score for the term is determined using the function:

$$S_{t_n} = \lambda_1 \frac{\log(P(t_n \mid M_2))}{\log(P(t_n \mid M_1))} + \lambda_2 \frac{\log(P(t_n \mid M_3))}{\log(P(t_n \mid M_1))}$$

where $S_{t_n}$ is the ambiguity score for term $t_n$, $\lambda_1$ is a first constant, $\lambda_2$ is a second constant, P is a function of probability, $M_1$ is the first language model, $M_2$ is the second language model, and $M_3$ is a third language model; and
outputting by the computer the ambiguity score for the term,
wherein the ambiguity score for the term is outputted as ranked list, with each score associated with corresponding terms.

2. The computer-implemented method of claim 1, wherein the first language model is based on a medical corpus of documents and the second language model is based on a legal or general news corpus of documents.

3. The computer implemented method of claim 1, wherein the ambiguity score is based on a ratio of a probability of the term given a non-medical corpus to a probability of the term given a medical corpus.

4. The method of claim 1, wherein first language model is based on the Unified Medical Language System (UMLS).

5. The method of claim 1, further comprising:
determining that the ambiguity score meets a specified level.

6. The method of claim 1, further comprising:
linking the term to a related document.

7. A computerized system comprising:
an input for receiving by a computer a terms;
a processor for executing code adapted to determine by the computer an ambiguity score for the term, wherein the ambiguity score is based on a ratio of a probability of the term and at least first, second and third language models of a plurality of language models, and wherein the first language model is based on a medical corpus of documents and the second language model is based on a general news corpus of documents and the third language model is based on a legal corpus of documents,
wherein the ambiguity score for the term is determined using the function:

$$S_{t_n} = \lambda_1 \frac{\log(P(t_n|M_2))}{\log(P(t_n|M_1))} + \lambda_2 \frac{\log(P(t_n|M_3))}{\log(P(t_n|M_1))}$$

where $S_{t_n}$ is the ambiguity score for term $t_n$, $\lambda_1$ is a first constant, $\lambda_2$ is a second constant, P is a function of probability, $M_1$ is the first language model, $M_2$ is the second language model, and $M_3$ is a third language model, and
means for outputting by the computer the ambiguity score for the term,
wherein the ambiguity score for the term is outputted as ranked list, with each score associated with corresponding terms.

8. The system of claim 4, wherein the first language model is based on a medical corpus of documents and the second language model is based on a legal or general news corpus of documents.

9. The system of claim 4, wherein each ambiguity score is based on a ratio of a probability of the term given a non-medical corpus to a probability of the term given a medical corpus.

10. The system of claim 7, wherein first language model is based on the Unified Medical Language System (UMLS).

11. The system of claim 7, further comprising:
determining that the ambiguity score meets a specified level.

12. The system of claim 7, further comprising:
linking the term to a related document.

13. A non-transitory computer-readable medium comprising:
a code set configured receive by a computer a term;
a code set configured determined by the computer an ambiguity score for the term, wherein the ambiguity score is based on a ratio of a probability of the term and at least first, second and third language models of a plurality of language models, and wherein the first language model is based on a medical corpus of documents and the second language model is based on a general news corpus of documents and the third language model is based on a legal corpus of documents,
wherein the ambiguity score for the term is determined using the function:

$$S_{t_n} = \lambda_1 \frac{\log(P(t_n|M_2))}{\log(P(t_n|M_1))} + \lambda_2 \frac{\log(P(t_n|M_3))}{\log(P(t_n|M_1))}$$

where $S_{t_n}$ the ambiguity score for term $t_n$, $\lambda_1$ is a first constant, $\lambda_2$ is a second constant, P is a function of probability, $M_1$ is the first language model, $M_2$ is the second language odel, and $M_3$ is a third language model; and
a code set configured output by the computer the ambiguity score for the term,
wherein the ambiguity score for the term is outputted as ranked list, with each score associated with corresponding terms.

14. The non-transitory computer-readable medium of claim 13, wherein the first language model is based on a medical corpus of documents and the second language model is based on a legal or general news corpus of documents.

15. The non-transitory computer-readable medium of claim 13, wherein each ambiguity score is based on a ratio of a probability of the term given a non-medical corpus to a probability of the term given a medical corpus.

16. The non-transitory computer-readable medium of claim 13, wherein first language model is based on the Unified Medical Language System (UMLS).

17. The non-transitory computer-readable medium of claim 13, further comprising:
determining that the ambiguity score meets a specified level.

18. The non-transitory computer-readable medium of claim 13, further comprising:
linking the term to a related document.

* * * * *